Feb. 12, 1952 E. F. LEWIS 2,585,023

TESTING EQUIPMENT FOR AUTOMATIC TELEPHONE SYSTEMS

Filed Oct. 23, 1948 4 Sheets-Sheet 1

INVENTOR
E. F. LEWIS
BY Percy P. Lantzy
ATTORNEY

TESTING EQUIPMENT FOR AUTOMATIC TELEPHONE SYSTEMS

Filed Oct. 23, 1948 4 Sheets-Sheet 2

INVENTOR
E. F. LEWIS
BY
ATTORNEY

Feb. 12, 1952 E. F. LEWIS 2,585,023

TESTING EQUIPMENT FOR AUTOMATIC TELEPHONE SYSTEMS

Filed Oct. 23, 1948 4 Sheets-Sheet 3

INVENTOR
E. F. LEWIS
BY Percy P. Lantzy
ATTORNEY

Feb. 12, 1952 E. F. LEWIS 2,585,023

TESTING EQUIPMENT FOR AUTOMATIC TELEPHONE SYSTEMS

Filed Oct. 23, 1948 4 Sheets-Sheet 4

INVENTOR
E. F. LEWIS
BY Percy P. Lantzy
ATTORNEY

Patented Feb. 12, 1952

2,585,023

UNITED STATES PATENT OFFICE 2,585,023

TESTING EQUIPMENT FOR AUTOMATIC TELEPHONE SYSTEMS

Elmer F. Lewis, Montclair, N. J., assignor to Federal Telephone and Radio Corporation, New York, N. Y., a corporation of Delaware Application October 23, 1948, Serial No. 56,204

11 Claims. (Cl. 179—175.21)

This invention has to do with automatic telephone systems and more particularly with a portable testing set that may be connected at an exchange to operate all the equipment needed to interconnect calling and called lines.

Many systems are known for connecting subscribers' lines via a test set and in particular circuits connectible to exchanges for performing routine tests therein. However, most of these systems are complicated and expensive since they usually take the form of a permanent installation whereby connections from the exchange are extended to a wire chief's desk who periodically performs routine tests on all the equipment.

The object of this invention is to provide a simple portable set which may be used to test the ability of an automatic telephone exchange to connect designated calling and called lines to one another, especially in a newly installed exchange prior to cut-over.

A feature of this invention is that a plurality of automatic dialing units, each of which is connectible to a calling and called line, will repeatedly dial the desired number and control the establishment of the connection.

According to another feature of this invention, a plurality of indicator lamps are associated with the dialing units to indicate the progress of the call.

Still another feature of the invention is that a remote control unit is provided whereby a plurality of the automatic dialing units are controlled.

Figure 1:
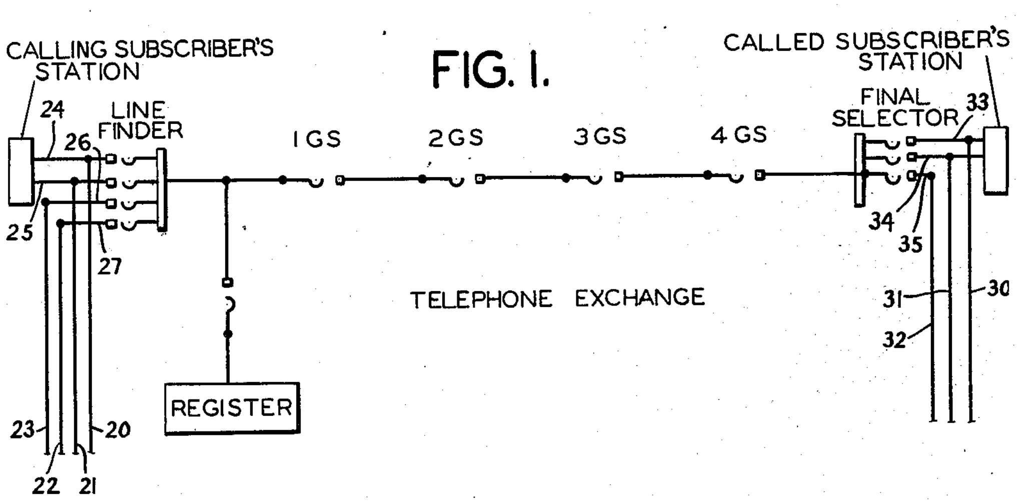
Figure 4:
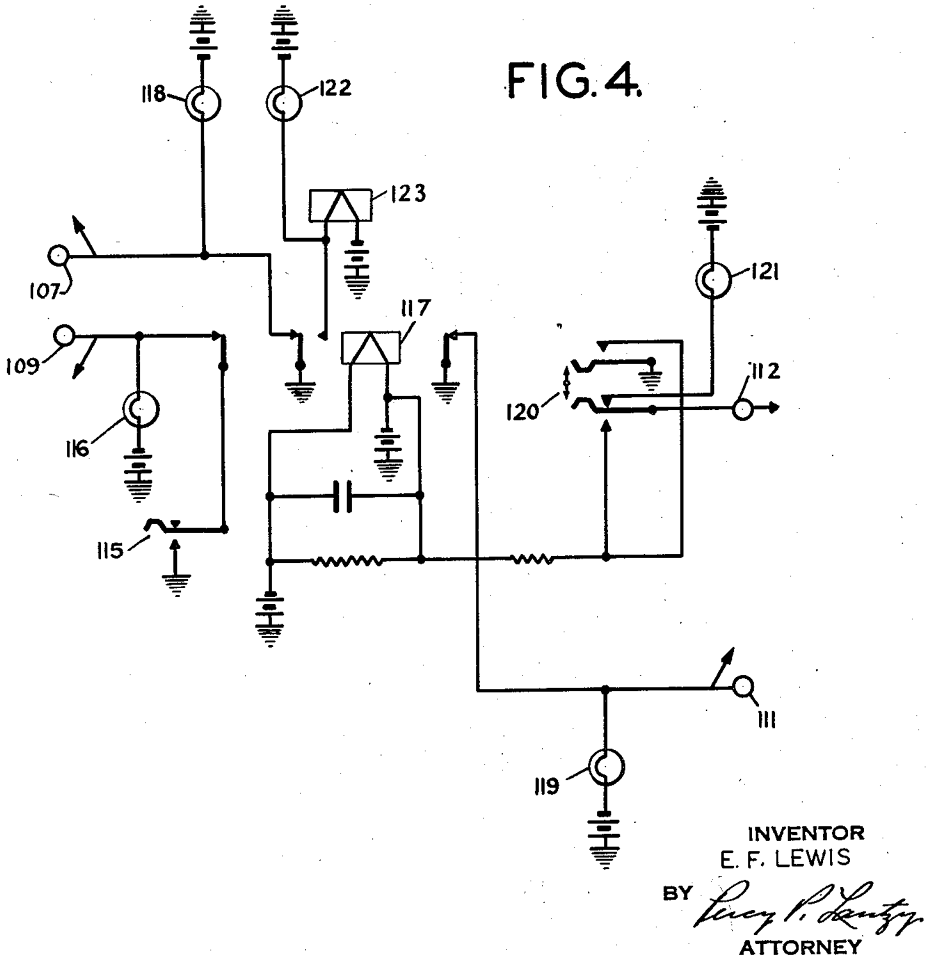
Figure 2:
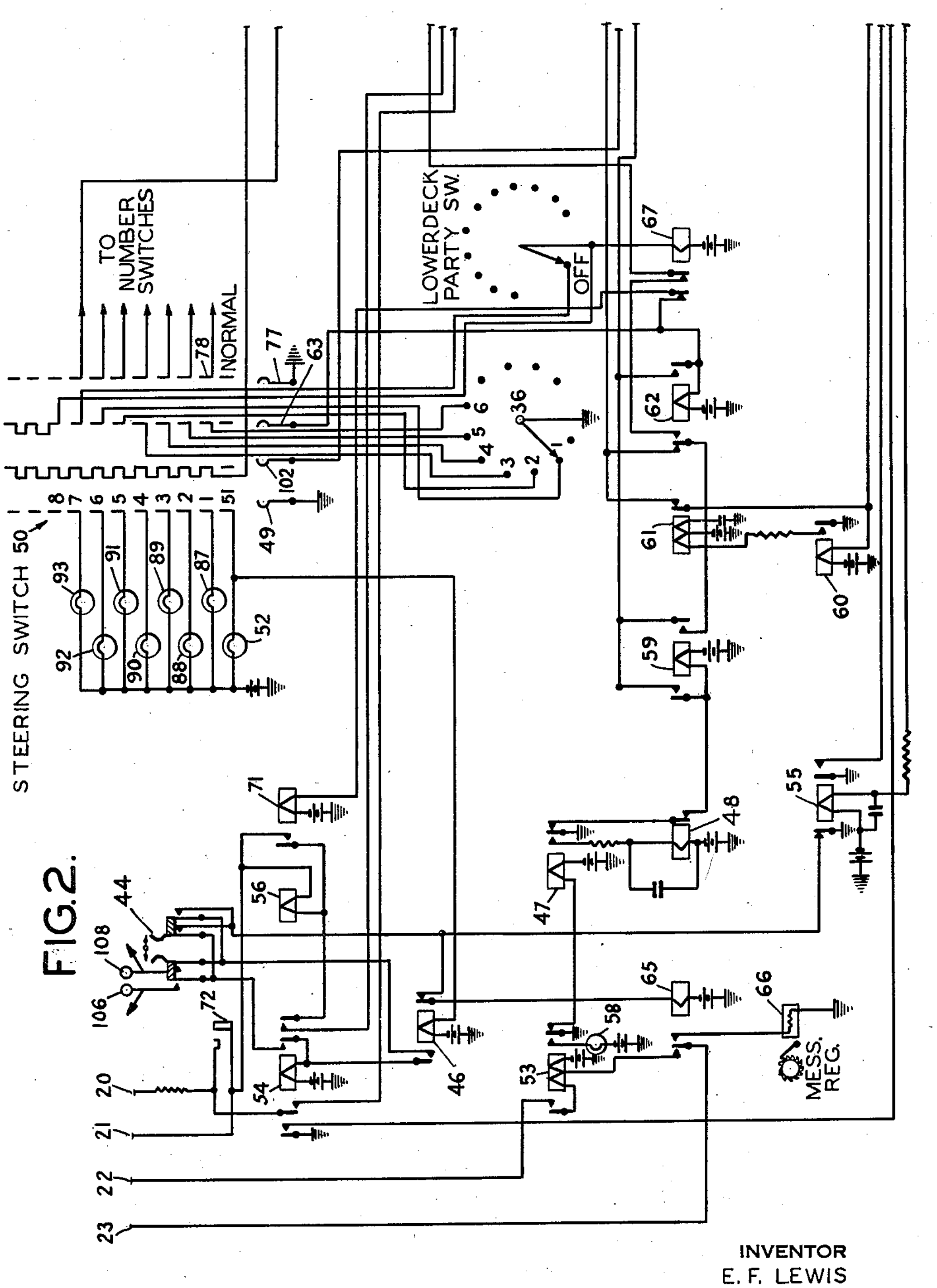
Figure 3:
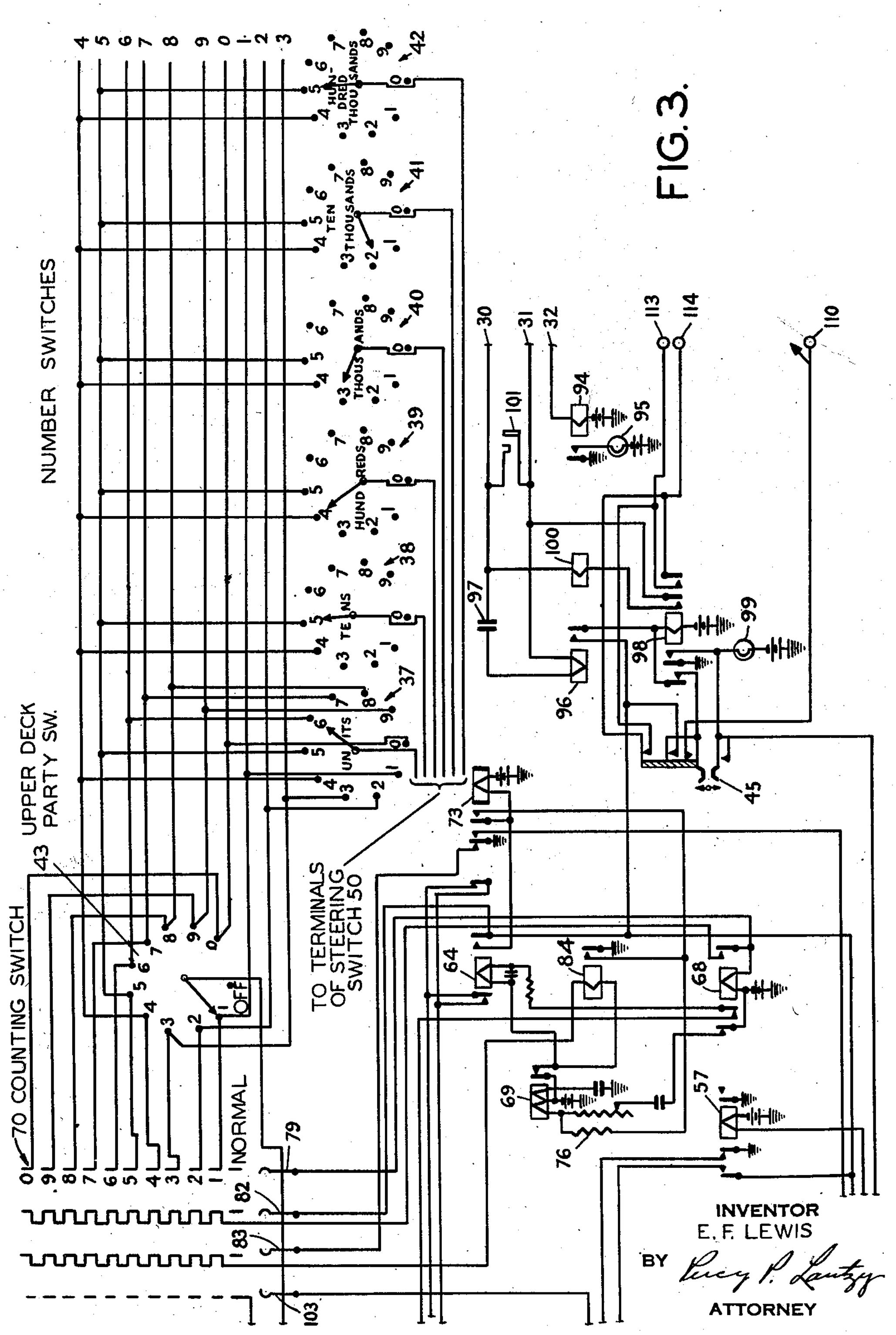
Figure 5:
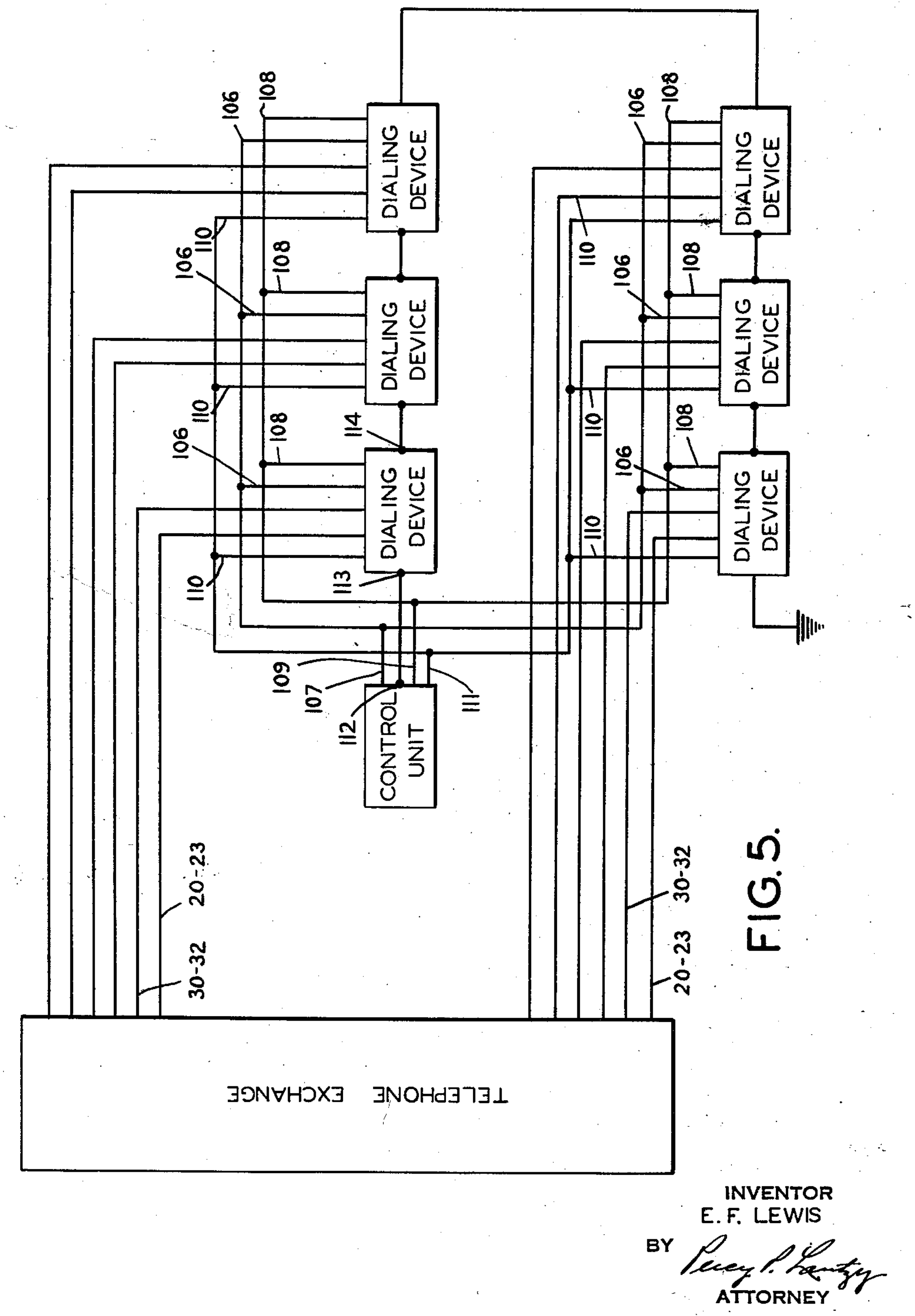

Other features of the invention will become obvious from the following detailed description taken in conjunction with the drawings, in which:

Fig. 1 is a schematic diagram of a portion of an automatic telephone exchange;

Figs. 2 and 3 when placed end to end show circuit diagrams of an automatic dialing device;

Fig. 4 is a circuit diagram of a control unit for a plurality of dialing devices; and Fig. 5 is a schematic diagram of a control unit and a plurality of dialing devices connected to an exchange.

According to the present invention, a portable test device having two cables is connected in an exchange, one cable to a calling subscriber's station and the other cable connected to a subscriber's station that is to be called. A plurality of multi-position switches in the test device are set by hand according to the digits of the number to be dialed. The switches control an impulse sending circuit which causes, first a line finder to seize the calling line, and then via a register, control group selectors and a final selector to extend the calling to the called line and ring the called station. The operation of each selector and the ringing of the called line are visually indicated in the test device which, after a successful connection, disconnects itself from the lines. After a brief period the number is again automatically dialed and the calling and called lines will again be interconnected. This cycle will continue as long as desired.

By way of example, one independently operated automatic dialing or testing device will now be described.

A cable in the testing device having wires 20, 21, 22, 23 is connected at the exchange in any convenient way, to four corresponding wires 24, 25, 26, 27 of a subscriber's line which is to be the calling line. Fourth wire 27 is connected to a register in the exchange that connects ground to the wire as the register advances in the well known manner.

Another cable has three wires 30, 31, 32 (Fig. 3) which are conveniently connected at the exchange to corresponding wires 33, 34, 35 of a subscriber's line that is to be the called line.

The connections between the wires of the testing device and those of the calling and called lines may be made either manually or when a plurality of test units are employed, by means of step-by-step switches (not shown).

A digit switch 36 is set to the number of digits to be dialed. Number switches 37, 38, 39, 40, 41, 42 (Fig. 3) are respectively set in accordance with the units, tens, hundreds, thousands, ten thousands and hundred thousands digits of the called number. If the called station is on a party line, party switch 43 is set in accordance with the party line designation. Otherwise, the switch 43 is left in "off" position. If the called number is, for instance 123456J, digit switch 36 is placed on 6, party switch 43 on 5, units switch 37 on 6, tens switch 38 on 5, hundreds switch 39 on 4, thousands switch 40 on 3, ten thousands switch 41 on 2, and hundred thousands switch 42 on 1.

Start key 44 (Fig. 2) is thrown to the right, to local position, and receiving key 45 (Fig. 3) is thrown down to local position. A suitable power switch (not shown) is turned on whereupon relays 46, 47 and 48 are energized. 46 is energized from battery over its winding to ground at wiper 49 of steering or marker switch 50. Switch 50, depending on the setting of digit switch 36, selects the digit to be dialed and controls the dialing by advancing one step after each digit to switch control from one number switch to the next successive one until all the digits of the called number have been dialed. When switch 50 is in normal position wiper 49 rests on terminal 51 and a white lamp 52 is lighted indicating that the device is in normal condition and ready to begin operation. Relay 47 is energized over a back contact of relay 53, and 48 is energized over a front contact of 47.

Relay 54 now operates over front contact of 46, key 44 to ground at a back contact of ground control relay 55. Relay 54 locks over a right hand front contact to the same ground and the circuit comprising wires 20, 21, which, as previously explained, have been connected to the calling line, is closed over left hand front contact relay 54, back contact of dialing relay 64, right hand front contact of 54, talk coil 56. Relay 57 is energized over a left hand front contact of 54.

The closing, over the contacts of relay 54, of the circuit comprising wires 20, 24 and wires 21, 25 operates the line finder in the usual manner to seize the calling line and the register in the exchange is attached to the line finder and connects ground to wire 23, all in the well known manner. Relay 53 is thereby energized and ground is locked to wire 22 over left hand front contact of 53. A green lamp 58 is lit over right hand front contact of 53 to indicate the beginning of dialing.

Energization of relay 53 removes ground from relay 47 which releases and in turn deenergizes relay 48. Relay 48 has a condenser of suitable value placed across its winding and therefore delays in releasing for a period sufficient to permit the register in the exchange to advance to a waiting position, whereupon relay 48 releases. Relay 59 is then energized over the back contacts of relays 47 and 48 and locks over its own left hand front contact to ground at relay 55 over the left hand front contact of relay 57.

The operation of relay 59 energizes relay 60 over the interrupter springs of magnet 61 of steering switch 50, back contact relay 62, right hand front contact 59, left hand front contact 57, ground right hand back contact relay 55. Magnet 61 is energized over the front contact of relay 60 and causes switch 50 to take one step. This will operate the interrupter springs of the magnet whereupon relay 60 is released. When 60 deenergizes it opens the circuit of magnet 61 which, in turn, releases and reenergizes relay 60. This cycle of operation continues and steering switch 50 is moved step by step.

One of the terminals in the arc of wiper 63 of switch 50 is grounded by the digit switch 36. Switch 50 will be stepped until this ground is encountered, whereupon relay 62 is energized and locks up on its own right hand front contact. Ground is thereby removed from magnet 61 and relay 60 which are deenergized.

As switch 50 takes its first step wiper 49 moves off terminal 51 and relay 46 deenergizes, thereby opening the operating circuit of relay 54. However, 54 remains locked up over a right hand front contact. Relay 65 is now energized over the back contact of relay 46. The front contact of relay 65 connects wire 23 to the relay 66 which controls metering of the call in the well known manner.

When relay 62 becomes energized the start ground at relay 55 is applied to wiper 63 of switch 50. The ground at relay 55 is connected also via 57 back, 59 front, 62 front, back contact of relay 67, back contact of 68, winding relay 64, to battery through the interrupter springs of magnet 69 of counting switch 70. One of the sets of terminals of switch 70 is multipled to all the number switches and the upper deck of the party switch.

Relay 71 operates in parallel with relay 62 through another back contact of relay 67 and shorts out talk coil 56 over a front contact because dialing cannot take place with the talk coil in the dialing circuit. The short is maintained during dialing to prevent listening or talking over a jack 72.

With dialing relay 64 energized, ground from relay 55 over right hand front contact of 64 energizes relay 73. Relay 73, over a left hand front contact, connects this ground to magnet 69. A timing circuit comprising a condenser and an adjustable resistor are across the winding of magnet 69. This timing circuit plus a series resistor 76 in the operating circuit of magnet 69 insures that it will be slow operating. When magnet 69 operates its opens its own interrupter springs thereby deenergizing relay 64 which in turn deenergizes relay 73 and removes ground from magnet 69. Relay 73 is slow in releasing and therefore remains energized during the pulsing cycle of relay 64 and releases only after each digit has been dialed. The previous operation of steering switch 50 moved its wiper 77 onto terminal 78, whereby ground is placed on the arm of hundred thousands switch 42 and if switch 42 is set to number 5 ground is placed on the fifth terminal in the arc of wiper 79 of counting switch 70.

Each time dialing relay 64 operates counting switch 70 advances one step. The operation of relay 64 opens the calling line circuit (20, 24, 21, 25) traced over the back contact of 64, and each time the relay operates a pulse is transmitted to the register. The register responds to these pulses the same way as to pulses dialed from any calling station.

Switch 70 will continue to advance step by step until wiper 79 encounters the ground from hundred thousands switch 42. This ground energizes relay 68 thereby opening the operating circuit of dialing relay 64. Relay 68 locks over its front contact to ground at relay 55 over wiper 82. Relay 73, which was energized during the operation of dialing relay 64 now releases and places ground over its back contact on wiper 83, any terminal engaged by wiper 83, winding of relay 84 to battery through the interrupter springs of magnet 69. When 84 operates, ground from its front contact is placed on the winding of magnet 69 which operates and, in turn, opens the circuit of relay 84. In this manner switch 70 is stepped around until it returns to its normal position in which ground is removed from relay 84. Relay 68, while switch 70 is being stepped around to normal, operates to remove the timing circuit from magnet 69 so that switch 70 may be rapidly restored to normal. When the switch reaches normal the locking path of relay 68 through wiper 82 is opened and relay 68 releases thereby transferring the operating ground to dialing relay 64 and restoring the timing circuit. Relay 64 becomes energized after slow acting relay 73 has been operated during the first train of pulses from relay 64, ground is placed over front contact of 73 on the winding of relay 60 which energizes magnet 61. When relay 73 deenergizes, as well as during the return of switch 70 to normal, steering switch 50 takes one step to extend ground from wiper 79 to the next successive number switch, the ten thousands digit switch 41. Relay 64 in a magnet 69 again steps switch 70 until wiper 79 encounters a ground placed on its terminal by ten thousands number switch 41. Thereafter, relay 68 operates to restore the switch 70 as above described.

These operations are repeated for each number switch. Party switch 43 is the last number switch to operate and has a make contact on its lower deck in "off" position that shorts the seventh and eighth terminals of wiper 63. When wiper 63 reaches the seventh terminal, ground is placed on the winding of relay 67 which opens the operating circuit of dialing relay 64 and stops dialing. If it is desired to dial a party digit the party switch will be set on the desired number and this digit must be transmitted before wiper 63 of switch 50 reaches the eighth terminal and causes the operation of relay 67.

Lamps 87—93 are connected to one of the sets of terminals of switch 50 and light as each digit is dialed to provide visual indication of the progress of the dialing.

When the dialing is completed, the final selector in the exchange places ground on wire 35 of the called line, in the well known manner. This wire is connected to wire 32 in the testing device and relay 94 is energized and a red lamp 95 lights.

In the usual manner ringing current is applied to the called line and wires 30 and 31 to energize relay 96 which has a 2MFD condenser 97 in its circuit. Relay 98 is now energized over front contact of 96 to ground on a back contact of 55. Relay 98 locks itself over a left front contact to the same ground and a white lamp 99 lights. By means of another front contact, relay 98 places coil 100 across the incoming line, thereby tripping the ringing current. A jack 101 is provided across the incoming line to permit listening and talking.

In a well known manner the first group selector in the exchange connected to the circuit under test will place battery on wire 23 whereby metering will take place via the front contact of relay 65 and the message register.

Ground control relay 55 is energized over a left hand front contact of relay 98 and key 45. Relay 55 is slow-operating permitting sufficient time for the first group selector in the exchange to advance for metering. Relay 55 remains operated for a short period thereby removing locking ground of relay 54 and the calling line is released. Energization of 55 also opens the locking circuit of relay 98 thereby releasing the called line. Deenergization of relay 54 permits relay 57 to release, thereby deenergizing relay 62 and 59. When relay 57 is deenergized a ground from a left hand back contact is placed on wiper 102 of switch 50. This ground is extended through wiper 103 of switch 70, through the interrupter contacts of magnet 61 to relay 60. This causes switch 50 to move to normal position and relay 46 operates causing relay 54 to operate and the cycle of operation above described is repeated.

Thus, it will be seen that a testing device once it has been set up and connected between two lines, will repeatedly dial the called number into the exchange to connect the lines to one another.

The operation of a plurality of the automatic testing devices under the supervision of a control device will now be described, referring particularly to Figs. 4 and 5 in which the circuit of such a control device is shown.

Each of a plurality of the automatic devices is connected in the exchange to the lines to be tested. The dial, number and party switches in each device are set to the called numbers. Start keys 44 in each device are thrown to the left or remote operating position and receive keys 45 thrown up. Terminals 106 of the devices are multipled to terminal 107 of the control unit. Terminals 108 of the devices are multipled to terminal 109 of the control unit. Terminals 110 of the dialing devices are multipled to terminal 111 of the control device. Terminal 112 of the control device connects to terminal 113 of one of the dialing devices. A terminal 114 in this dialing device extends this connection to the next device which extends it to the following one, thereby connecting the devices in series. This connection is continued through all the devices to ground at the last one.

Operation of master start key 115 (Fig. 3) places ground on all the starting circuits of the individual devices, to energize relays 54 in each device, terminal 109, terminal 108, left hand position key 44, left hand front contact relay 46 and battery at relay 54. Indicator lamp 116 in the control unit lights to show that operation of the unit has commenced. Relay 54 is locked over a right hand front contact to ground at left hand back contact of ground control relay 117 in the control unit, right hand front contact 54, key 44, terminal 106, terminal 107, and ground left hand back contact 117. Indicator lamps 118, 119 in the control unit light to show that ground is connected to the calling and called lines.

Each device as above described, will now proceed to dial the number of its called line. As a device completes its call its relay 98 will lock to ground, left hand front contact relay 98, key 45 in raised position, terminal 110, terminal 111 to ground at right hand back contact relay 117. With key 120 in normal position, as each device completes its call lamp 121 will light.

A link circuit that connects all the devices in series is closed over terminals 113 and 114, over a right hand front contact relay 98. If each device is successful in putting through its call and all the relays 98 operate, the link circuit will be closed over terminal 112 and key 120, whereupon indicator lamp 121 lights. If key 120 is in the down position lamp 121 will not light and ground from the last device over the series connection will be connected to battery at relay 117. A suitable timing circuit is placed across the winding of relay 117 to make it slow operating so that the first group selectors in the exchange may cause metering in the well known manner. When relay 117 operates, lamps 118 and 119 are extinguished and ground is removed from all relays 54 in the dialing devices and all the calling lines are released. Operation of relays 55 opens the circuits of relays 98 and all the called lines are released. Lamp 122 is thereupon operated over left hand front contact of relay 117 and indicates the termination of all the calls. Message register relay 123 for the group of devices will thereupon be energized. The deenergization of relays 98 opens the series connection between the individual devices and relays 117 is slowly deenergized.

If one of the devices has been unable to complete its call for any reason, the series connection will not be closed and depending on the position of key 120, lamp 121 or 122 will not light. Inspection of the individual devices will reveal which one has failed to put through its connection, since its white lamp 99, that indicates whether or not ringing current has been applied to the called line, will not be lit. By placing a busy block in jack 72 of this device so as to hold the call, the power of the device may be turned off and its start and receive keys placed in normal position. When key 45 is in normal position the series connection may be completed around the inoperative device and the rest of the devices and the control unit will continue to operate.

Variations and other embodiments of the invention will be suggested by the foregoing to those skilled in the art. However, it is intended to limit the invention only by the scope of the appended claims.

What I claim is:

1. In a telephone exchange system, a plurality of subscribers' lines, means for establishing a connection between a calling and a called line, a testing device for operating said means to establish connections between calling and called lines comprising means for connecting the device to a line desired to be tested as a calling line, means for connecting the device to a line desired to be tested as a called line, a digit switch having contacts and an arm cooperating therewith, said arm being movable with respect to the contacts to indicate the number of digits to be dialed, a plurality of number switches each having contacts and an arm cooperating therewith, a steering switch having terminals and wipers cooperating therewith, terminals of the steering switch connected to contacts of said digit switch and to arms of the number switches, a counting switch having terminals and wipers cooperating therewith, terminals of the counting switch connected to the contacts of the number switches, means for moving the wipers of said steering switch, means for moving the wipers of said counting switch, a dialing relay controlled by said switches whereby pulses corresponding to the number of the called line are transmitted to the exchange to operate the means for establishing the connection to the called line, relay means operable after a predetermined time for releasing the called line, and indicator lamps connected to the terminals of the steering switch for indicating the dialing of each digit.

2. In a telephone exchange system, a plurality of subscribers' lines, for establishing a connection between a calling and a called line, means for ringing the called line, a testing device for operating said means to establish connections between calling and called lines comprising means for connecting the device to a line desired to be tested as a calling line, means for connecting the device to a line desired to be tested as a called line, a digit switch having contacts and an arm cooperating therewith, said arm being movable with respect to the contacts to indicate the number of digits to be dialed, a party switch having contacts and an arm cooperating therewith, a plurality of number switches each having contacts and an arm cooperating therewith, a steering switch having terminals and wipers cooperating therewith, terminals of the steering switch connected to contacts of said digit switch and to the arms of said party and number switches, a counting switch having terminals and wipers cooperating therewith, terminals of the counting switch connected to the contacts of all the number switches and of the party switch, means for moving the wipers of said steering switch, means for moving the wipers of said counting switch, a dialing relay controlled by said switches whereby pulses corresponding to the number of the called line are transmitted to the exchange to operate the means for establishing the connection to the called line and for ringing it, relay means operable to trip the ringing means after the call is completed, relay means operable after a predetermined time for releasing the called line, and an indicator lamp connected to the terminals of said steering switch whereby the dialing of each digit is indicated.

3. In a telephone exchange system, a plurality of subscribers' lines, means for establishing a connection between a calling and a called line, means for ringing the called line, a testing device for operating said means to establish connections between calling and called lines comprising a first cable connectible to a line desired to be tested as a calling line, a second cable connectible to a line desired to be tested as a called line, a digit switch having contacts and an arm cooperating therewith, said arm being movable with respect to the contacts to indicate the number of digits to be dialed, a party switch having contacts and an arm cooperating therewith, a plurality of number switches each having contacts and an arm cooperating therewith, a steering switch having terminals and wipers cooperating therewith, one set of said terminals connected to contacts of said digit switch and another set to the arms of said party and number switches, a counting switch having terminals and wipers cooperating therewith, one set of the counting switch terminals being multipled to the contacts of all the number switches and of the party switch, means for moving the wipers of said steering switch, means for moving the wipers of said counting switch, a dialing relay controlled by said switches whereby pulses corresponding to the number of the called line are transmitted to the exchange to operate the means for establishing the connection to the called line and for ringing it, relay means connected over said second cable to the called line operable to trip the ringing means after the call is completed, an indicator lamp operable by said last-mentioned relay means for indicating the ringing of the called line, relay means operable after a predetermined time for releasing the called line, and an indicator lamp connected to each terminal of one of the sets of terminals of said steering switch whereby the dialing of each digit is indicated.

4. A telephone exchange system having a plurality of subscribers' lines, means for establishing connections between calling and called lines, a plurality of automatic dialing devices, for operating said means to establish connections between calling and called lines, each of said dialing devices comprising means for connecting it to a line desired to be a calling line and to a line desired to be a called line, a plurality of multi-position switches movable into positions corresponding to the number of digits to be dialed, means controlled by said switches for transmitting to the exchange pulses in accordance with the digit settings of said switches to operate the means for establishing the connections between calling and called lines, a control means for said devices, connections from each of said devices to the control means, and means in said control means for simultaneously operating all of said devices.

5. The device according to claim 4, and indicating means in said control means for indicating completion of all the calls by all the devices.

6. The device according to claim 4, and indicating means in said control means for indicating that at least one of the devices has not completed its call.

7. The device according to claim 4, and first indicating means in said control means for indicating completion of a call by each device, and second indicating means in the control means for indicating that at least one of the devices has not completed its call.

8. A telephone exchange system having a plurality of subscribers' lines, means for establishing connections between calling and called lines, a plurality of automatic dialing devices for operating said means to establish connections between calling and called lines, each of said dialing devices comprising means for connecting it to a line desired to be a calling line and to a line desired to be a called line, a plurality of multi-position switches movable into positions corresponding to the number of digits to be dialed, means controlled by said switches for transmitting to the exchange pulses in accordance with the digit settings of said switches to operate the means for establishing the connections between calling and called lines, a control unit, multiple connections from the control unit to each dialing device, a series connection from the control unit through each dialing device closed after all the dialing devices have completed their calls, indicating means in the control unit for indicating that at least one of the devices has not completed its call, and indicating means for indicating closing of said series connection.

9. The device according to claim 8, and indicating means in each dialing device for indicating its operation.

10. A telephone exchange system having a plurality of subscribers' lines, means for establishing connections between calling and called lines, means for ringing the called lines, a plurality of automatic testing devices for operating said means for establishing connections between calling and called lines, a remote control unit, multiple connections from said control unit to each testing device, a link circuit extending from the control unit through each testing unit connecting said plurality of testing devices in series, said link circuit being closed after all the testing units have completed their calls, indicating means in the control unit for indicating that at least one of the devices has not completed its call, and indicating means for indicating closing of said series link circuit.

11. A telephone exchange system having a plurality of subscribers' lines, means for establishing connections between calling and called lines, means for ringing the called lines, a plurality of automatic testing devices for operating said means for establishing connections between calling and called lines, a remote control unit, multiple connections from said control unit to each testing device, a link circuit extending from the control unit through each testing unit connecting said plurality of testing devices in series, said circuit being closed after all the testing units have completed their calls, indicating means in the remote control unit for indicating that at least one of the devices has not completed its call, indicating means for indicating closing of said series circuit, each of said testing devices comprising, a first cable connectible to a line desired to be tested as a called line, a digit switch having contacts and an arm cooperating therewith, said arm being movable with respect to the contacts to indicate the number of digits to be dialed, a party switch having contacts and an arm cooperating therewith, a plurality of number switches each having contacts and an arm cooperating therewith, a steering switch having terminals and wipers cooperating therewith, one set of said terminals connected to contacts of said digit switch and another set to the arms of said party and number switches, a counting switch having terminals and wipers cooperating therewith, one set of the counting switch terminals being multipled to the contacts of all the number switches and of the party switch, means for moving the wipers of said steering switch, means for moving the wipers of said counting switch, a dialing relay controlled by said switches whereby pulses corresponding to the number of the called line are transmitted to the exchange to operate the means for establishing the connection to the called line and for ringing it, relay means connected over said second cable to the called line operable to trip the ringing means after the call is completed, an indicator lamp in said testing device operable by said last-mentioned relay means for indicating the ringing of the called line, relay means operable after a predetermined time for releasing the called line, and an indicator lamp connected to each terminal of one of the sets of terminals of said steering switch whereby the dialing of each digit is indicated.

ELMER F. LEWIS.

REFERENCES CITED

The following references are of record in the file of this patent:

UNITED STATES PATENTS

| Number | Name | Date |
|---|---|---|
| 1,808,902 | Miller | June 9, 1931 |
| 2,065,894 | Hovland | Dec. 29, 1936 |
| 2,253,650 | Richard | Aug. 26, 1941 |
| 2,293,588 | Cain | Aug. 18, 1942 |
| 2,345,959 | Blessing | Apr. 4, 1944 |
| 2,358,267 | Vander Els | Sept. 12, 1944 |